US012307469B1

(12) United States Patent
Black et al.

(10) Patent No.: US 12,307,469 B1
(45) Date of Patent: May 20, 2025

(54) SYSTEMS AND METHODS FOR PROVIDING PUSH NOTIFICATIONS RELATING TO EXISTING BENEFITS ASSOCIATED WITH A MEMBER ACCOUNT

(71) Applicant: United Services Automobile Association (USAA), San Antonio, TX (US)

(72) Inventors: Robert Lee Black, San Antonio, TX (US); Timothy Blair Chalmers, San Antonio, TX (US); Zachery C. Lake, Fort Wayne, IN (US); Justin Dax Haslam, San Antonio, TX (US); Matthew Robert Byrd, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 142 days.

(21) Appl. No.: 17/679,703

(22) Filed: Feb. 24, 2022

Related U.S. Application Data

(60) Provisional application No. 63/154,308, filed on Feb. 26, 2021.

(51) Int. Cl.
*G06Q 30/02* (2023.01)
*G06Q 30/012* (2023.01)
*G06Q 30/0201* (2023.01)
*G06Q 40/03* (2023.01)

(52) U.S. Cl.
CPC ....... *G06Q 30/0201* (2013.01); *G06Q 30/012* (2013.01); *G06Q 40/03* (2023.01)

(58) Field of Classification Search
CPC .. G06Q 30/0201; G06Q 30/012; G06Q 40/03; G06Q 30/0207–30/0277
See application file for complete search history.

(56) References Cited

U.S. PATENT DOCUMENTS

| 8,762,175 B1 * | 6/2014 | Shutko ................... G16H 20/00 705/2 |
| 10,360,551 B1 * | 7/2019 | Perry ..................... G06Q 20/20 |
| 10,535,104 B1 * | 1/2020 | Mitchell ................ G06Q 40/08 |
| 12,014,422 B1 * | 6/2024 | Madigan ............... G06Q 40/08 |

(Continued)

*Primary Examiner* — Thuy N Nguyen
(74) *Attorney, Agent, or Firm* — Fletcher Yoder, P.C.

(57) ABSTRACT

Embodiments of the present disclosure include systems and methods for generating push notifications relating to member benefits of members of an organization based on monitored activity of the members. For example, embodiments of the present disclosure include a push notification monitoring/generation system that includes one or more processors configured to execute computer-executable instructions, wherein the computer-executable instructions, when executed by the one or more processors, cause the one or more processors to receive data relating to member activity of a member of an organization; to analyze the data relating to the member activity to identify one or more member benefits provided by the organization, wherein the one or more member benefits are related to the member activity; and to automatically transmit one or more push notifications relating to the one or more member benefits to a member benefit application being executed on a computing device associated with the member.

20 Claims, 6 Drawing Sheets

(56) References Cited

U.S. PATENT DOCUMENTS

| | | | |
|---|---|---|---|
| 2010/0241501 A1* | 9/2010 | Marshall | G06Q 30/0224 705/14.23 |
| 2011/0161150 A1* | 6/2011 | Steffens | G06Q 30/0224 705/14.28 |
| 2012/0123806 A1* | 5/2012 | Schumann, Jr. | G06Q 40/08 705/4 |
| 2012/0271691 A1* | 10/2012 | Hammad | G06Q 30/02 705/14.17 |
| 2013/0191198 A1* | 7/2013 | Carlson | G06F 9/468 705/14.23 |
| 2014/0278513 A1* | 9/2014 | Prakash | G06Q 30/0601 705/2 |
| 2014/0279231 A1* | 9/2014 | Pinski | G06Q 20/227 705/26.41 |
| 2015/0187015 A1* | 7/2015 | Adams | G06Q 40/08 705/4 |
| 2015/0379565 A1* | 12/2015 | Hiramatsu | G06Q 30/0253 705/14.51 |
| 2016/0086222 A1* | 3/2016 | Kurapati | G06Q 40/08 705/14.53 |
| 2017/0316417 A1* | 11/2017 | Wang | G06Q 20/387 |
| 2018/0268431 A1* | 9/2018 | Harris | G06Q 30/0212 |
| 2019/0122286 A1* | 4/2019 | Lang | G06Q 30/0226 |
| 2019/0378143 A1* | 12/2019 | Volpi | G06Q 30/02 |
| 2020/0051055 A1* | 2/2020 | Nam | G06Q 40/10 |
| 2020/0143921 A1* | 5/2020 | Shutko | G06Q 40/08 |
| 2020/0286116 A1* | 9/2020 | Hazelton | G06Q 20/127 |
| 2020/0357014 A1* | 11/2020 | Kramer | H04W 4/14 |
| 2020/0380550 A1* | 12/2020 | Schroll | G06Q 30/0239 |
| 2021/0166322 A1* | 6/2021 | Allen | G06Q 40/08 |
| 2021/0201359 A1* | 7/2021 | Sekar | G06Q 30/0244 |
| 2022/0101378 A1* | 3/2022 | Manfield | G06Q 30/0264 |
| 2023/0162224 A1* | 5/2023 | Biemer | G06Q 40/08 705/4 |

* cited by examiner

FIG. 6

SYSTEMS AND METHODS FOR PROVIDING PUSH NOTIFICATIONS RELATING TO EXISTING BENEFITS ASSOCIATED WITH A MEMBER ACCOUNT

CROSS-REFERENCE TO RELATED APPLICATION

This application claims priority to and the benefit of U.S. Provisional Application No. 63/154,308 entitled "Systems and Methods for Providing Push Notifications Relating to Existing Benefits Associated with a Member Account," filed Feb. 26, 2021, which is hereby incorporated by reference in its entirety for all purposes.

TECHNICAL FIELD

The present disclosure relates generally to systems and methods for generating push notifications relating to member benefits of members of an organization based on monitored activity of the members.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Members of certain organizations (e.g., members insured by an insurance company) are often entitled to certain member benefits (e.g., insurance coverage) that the members may not be aware. For example, the member may not be aware that a particular insurance plan covers certain types of property. Because of this, the member may buy additional insurance coverage, warranties, and so forth, when they don't really need to. As such, it may be advantageous to monitor activity of members to more proactively advise them of existing member benefits associated with the monitored activity.

BRIEF DESCRIPTION

Certain embodiments of the present disclosure include a push notification monitoring/generation system that includes one or more processors configured to execute computer-executable instructions, wherein the computer-executable instructions, when executed by the one or more processors, cause the one or more processors to receive data relating to member activity of a member of an organization; to analyze the data relating to the member activity to identify one or more member benefits provided by the organization, wherein the one or more member benefits are related to the member activity; and to automatically transmit one or more push notifications relating to the one or more member benefits to a member benefit application being executed on a computing device associated with the member.

Certain embodiments of the present disclosure also include a method that includes a method that includes receiving, via a push notification monitoring/generation system, data relating to member activity of a member of an organization. The method also includes analyzing, via the push notification monitoring/generation system, the data relating to the member activity to identify one or more member benefits provided by the organization. The one or more member benefits are related to the member activity. The method further includes automatically transmitting, via the push notification monitoring/generation system, one or more push notifications relating to the one or more member benefits to a member benefit application being executed on a computing device associated with the member.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, the term "application" refers to one or more computing modules, programs, processes, workloads, threads, and/or computing instructions executed by a computing system. Example embodiments of an application include software modules, software objects, software instances, and/or other types of executable code. As referred to herein, "member data" may include data associated with and/or identifying a member. In certain embodiments, member data may include data that relates to the actions performed by the member while utilizing a computing device, and/or with information associated with and/or identifying the member. For example, member data may include an indication of actions performed by the member (e.g., a website opened, cookies, an application accessed, a file downloaded, a link associated with a product that the member selected, a rating performed by the member such as an upvote or like, home or office temperature setting, preferred shows, light settings, activities, activity patterns, etc.), member identity data (e.g., IP address, email, and the like), or demographic information of the member (e.g., age, race, location, and the like).

As used herein, the term "insurance" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

The embodiments described herein include systems and methods for automatically providing push notifications to members of organization (e.g., an insurance company, a financial institution, and so forth) based on data relating to activity of the members, which may be monitored by a push notification system operated by the organization. In general, the push notifications are intended to notify, based on the monitored activity, the members of pre-existing member benefits and/or insurance coverage available through their association with the organization and/or to notify the members of certain member benefits and/or insurance coverage that may be available from the organization, wherein such member benefits are either directly or indirectly related to the monitored activity. As such, the push notification system described herein facilitates the automatic notification of member benefits and/or insurance coverage for the members, such that the members may make more informed decisions relating to the monitored activity.

For example, when a member is shopping for certain products (e.g., electronics, appliances, and other relatively large purchases), an application or extension running on computing device of the member may automatically offer products related to the purchase, such as a loan to purchase the product, an extended warranty for product, and so forth. In addition, the purchase of the product may be recorded in the application to keep track of the warranty. In certain embodiments, the application may automatically send a notification to remind the member that an extended warranty or other product is already provided by the organization. For example, the push notification system may detect that the member is located within an electronic store, and the application may automatically send a reminder to the member that certain electronics automatically receive an extra one-year warranty, if offered.

As another example, the application may automatically send a notification to the member to avoid paying for certain unneeded products (e.g., rental car insurance) prior to the member renting a vehicle. In addition, geofencing and itinerary data may be used to automatically detect the likelihood of a member renting a vehicle, and may automatically generate a push notification indicating that the member is covered via an auto insurance plan or credit card for the rental vehicle. For example, the notification may be automatically generated based on a parked car at an airport, a rideshare to an airport, payment made to rental facility (e.g., by detecting a transaction in real-time and recommending changing payment method to a credit card provided by the organization, which may include additional insurance coverage), and so forth. In certain embodiments, location change in relatively short period of times (e.g., the member moving greater than 150 miles/hour for a period of time), logins detected from other countries, cell phone towers (e.g., local communication networks) indicating that the member is in different countries, and so forth, may be used to detect the likelihood of traveling and/or of a rental car need to provide notifications to activate certain member benefits provided by the organization.

For example, in certain embodiments, cell-site location information (CSLI) collected by wireless carriers may comprise location information of the member. Cell phones, when in use, may continuously scan the environment to detect the strongest signal, usually coming from the closest cell phone towers. Each time a cell phone connects to a cell phone tower, it generates a time-stamped record known as CSLI comprising geographic area location information of the cell phone, and the wireless carriers may use this CSLI to plan their network or apply charges (e.g., roaming charges, international rates, and so forth). By way of example, the CSLI may indicate that the member is travelling a relatively large distance in a relatively short period of time (e.g., travelling to a foreign country) by comparing the CSLI of the member at different times during a time period. As data usage from cell phones has increased, more cell sites have been installed to cover a certain area leading to more precise location information. Thus, in certain embodiments, CSLI may provide relatively precise location information of the member, and this relatively precise location information (e.g., airports, rental facilities, merchants, hospitality organizations, relatively high risk areas for criminal or health concerns based on statistic-based prediction/geofencing, and so forth) may also be used to monitor activity of the member in a local area and help determine related benefits/insurance decisions, as described in greater detail herein.

In certain embodiments, when a member gets into an accident, the application may notice that rental reimbursement is available to the member. As such, the application may automatically provide a notification to the member that may identify that a credit card (e.g., provided by the organization) that should be used to make sure that the member is covered. Example notifications may include notifications to use a particular payment type (e.g., credit card provided by the organization) to maximize discounts, member benefits, insurance, and so forth. Notifications may also be automatically sent when a purchased product is already covered under another insurance plan (e.g., home insurance). Notifications may also be automatically provided when digital purchases that are made available for curbside are detected, chrome plug-ins detect what the member is purchasing, and so forth.

In certain embodiments, the application may detect purchase of airline tickets and may automatically offer traveler's insurance based on detection of the member traveling or being at a particular location. In addition, insurance may be solicited for certain experiences (e.g., sky diving, vaping, and so forth). Alternatively, the application may automatically provide a notification to nullify insurance based on detection of certain experiences that may result in an insurance policy being nullified. In addition, an additional insurance product may be automatically offered or even automatically provided to cover the uncovered experience. In certain embodiments, the application may automatically send a request for additional information regarding a particular purchase to possibly avoid nullifying insurance. In the same manner, the application may automatically provide a spot life insurance policy for certain events or activities over a predetermined amount of time (e.g., 24 hours).

In certain embodiments, the application may also detect when a gap in insurance is present for the member. For example, to protect against underinsured drivers (e.g., to provide gap medical coverage), the application may detect areas that have underinsured drivers. For example, these areas may be detected based on statistic-based prediction/geofencing. For example, the application may use geofencing to detect patterns to identify areas that are regularly traveled by the member and that have underinsured drivers, and may automatically push a notification for gap coverage based on the patterns. In addition, future vehicles may be equipped with broadcast tools that provide insurance data between nearby cars to further empower members. In addition, mapping services may be modified based on detection of underinsured areas to allow members to reroute or increase awareness to drive more carefully, avoid certain exits, and so forth.

In addition, the application may automatically provide notifications requesting feedback data on prior purchases or services received based on time delay, geofencing, detected activity, and so forth. For example, after receiving body shop repairs on a vehicle, the application may detect that the member is located at a body shop at a later time, and may automatically send a push request for the member to provide feedback on the previous body shop experience.

Figure 1:
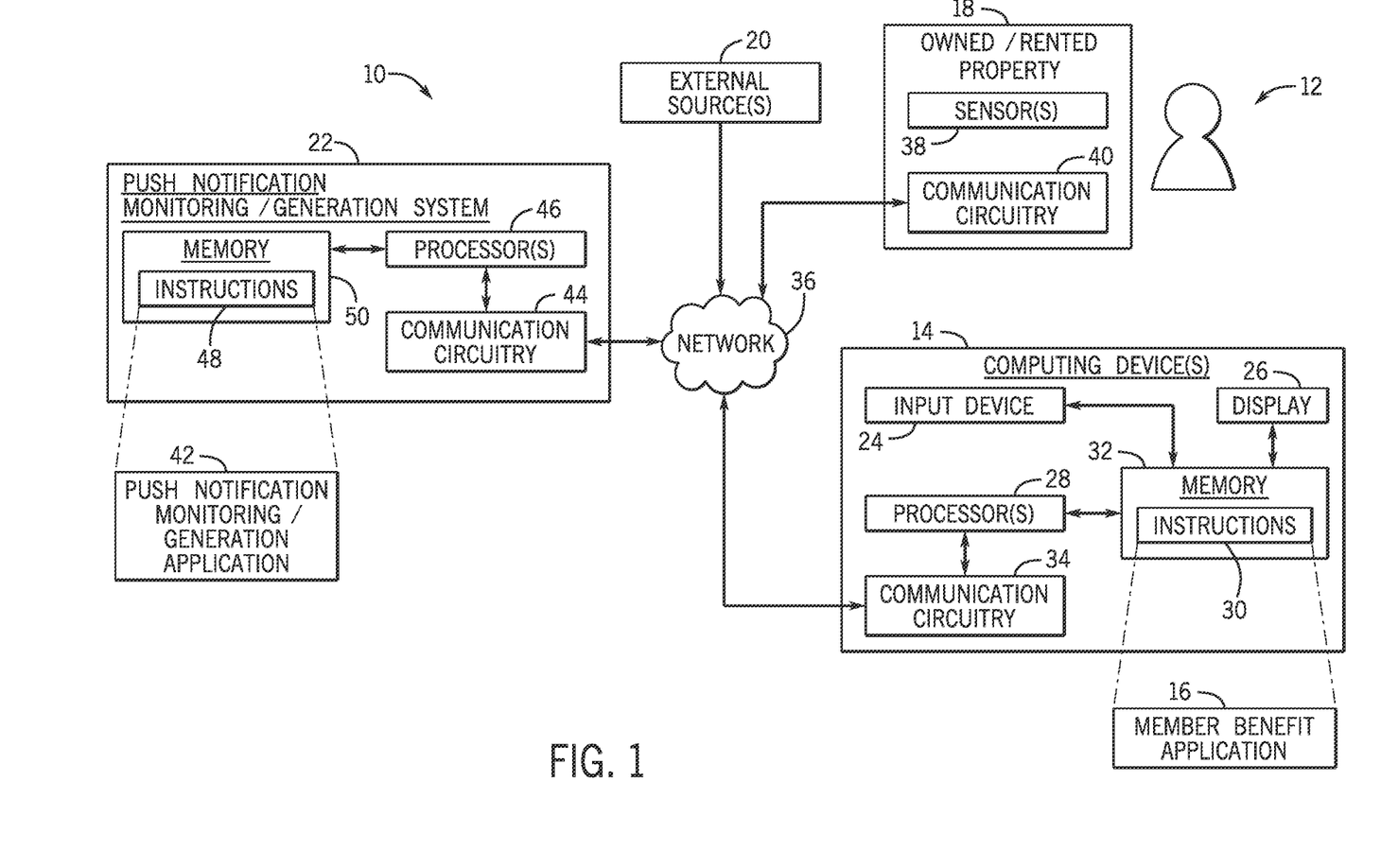
FIG. 1 is a schematic diagram of a push notification system configured to monitor activity of members of an organization, and to generate push notifications that may be automatically sent to one or more computing devices associated with the monitored members of the organization, in accordance with embodiments described herein.

FIG. 1 is a schematic diagram of a push notification system 10 configured to monitor activity of members 12 of an organization (e.g., insured parties by an insurance company), and to generate push notifications that may be automatically sent to one or more computing devices 14 associated with the monitored members 12 of the organization for the purpose of notifying the members 12 of particular member benefits that are either already available to the members 12 from the organization or that are available to be selected by the members 12 in view of the monitored activity. As described in greater detail herein, in certain embodiments, the activity of a particular member 12 may be monitored by a member benefit application 16 being executed on a computing device 14 associated with the particular member 12, by property 18 owned or otherwise being operated (e.g., when rented) by the particular member 12, or by one or more external sources 20, such as merchants, financial institutions, rideshare applications, rental car companies, travel agencies, airlines, hospitality organizations, and so forth. In certain embodiments, the owned or rented property 18 may include a vehicle owned or rented by the particular member 12, one or more smart devices installed in real estate property (e.g., a home) owned or rented by the member 12, and so forth.

In addition, in certain embodiments, the computing device 14 may include any computing device 14 configured to execute the member benefit application 16 including, but not limited to, smart phones, computing tablets, personal computers (PCs), laptop computers, wearable computing devices, and so forth. In certain embodiments, each computing device 14 may be registered with the push notification system 10 by, for example, registering the computing device 14 (e.g., using a universally unique identifier (UUID), media access control (MAC) address, and so forth) with a member account (e.g., using a unique member identification number) associated with a particular member 12. Therefore, interaction with the member benefit application 16 by a particular member 12 via a particular computing device 14 may be automatically associated with that member 12. For example, in certain embodiments, a first portion of the MAC address may indicate that a particular vendor (e.g., manufacturer, retail chain, specific store, and so forth) is associated with the computing device 14 and a second portion of the MAC address may indicate that the computing device 14 corresponds to a particular type of device (e.g., cell phone, tablet, laptop computer, and so forth). As such, the MAC address may indicate the particular computing device 14 being used by the member 12. In certain embodiments, a UUID (sometimes, the term globally unique identifier (GUID) may also be used) is used to register the computing device 14 with a member account associated with a particular member 12. When generated according to standard methods, UUIDs are generally unique.

Furthermore, as described in greater detail herein, push notifications generated by the push notification system 10 may be automatically transmitted to a particular computing device 14. In particular, in certain embodiments, when the push notification system 10 generates and transmits a particular push notification to a particular member 12, an instance of the member benefit application 16 on every computing device 14 associated with the particular member 12 may be automatically launched on the respective computing device 14 to notify the particular member 12 more quickly (see, e.g., FIGS. 6 and 7). In other words, each computing device 14 may function in a relatively low-power listening mode where the respective computing device 14 passively listens for push notifications generated by the push notification system 10, and automatically launches an instance of the member benefit application 16 on the respective computing device 14 based only on receipt of a push notification from the push notification system 10.

As described in greater detail herein, the activity of a particular member 12 detected by a member benefit application 16 being used by the particular member 12, owned or rented property 18 being operated by the particular member, and/or one or more external source(s) 20 may be transmitted to a push notification monitoring/generation system 22, which uses the detected activity to automatically generate one or more push notifications that may be automatically transmitted to the member benefit application 16 being used by the particular member 12 to notify the member 12 of particular member benefits that are either already available to the member 12 from the organization (e.g., the organization operating the push notification monitoring/generation system 22 and the associated member benefit application 16) or that are available to be selected by the member 12 in view of the detected activity.

For example, as will be appreciated, the member benefit application 16 being executed on a computing device 14 associated with the member 12 may be accessed by the member 12 to monitor member benefits provided by the organization to the member 12. In addition, the member 12 may initiate certain benefit-related activity, as described in greater detail herein, via interaction with the member benefit application 16 using the computing device 14. For example, manipulation of one or more input devices 24 (e.g., keyboards, mice, buttons, touch screens, and so forth) of the computing devices 14 may enable the members 12 to interact with the member benefit application 16, which may be displayed on one or more displays 26 (e.g., light emitting diode (LED) displays, organic LED (OLED) displays, and so forth) of the computing devices 14. In certain embodiments, the members 12 may login to particular computing devices 14 such that member identifiers (e.g., member identification numbers) may be tracked to associate detected activity with the particular member 12.

As illustrated in FIG. 1, in certain embodiments, the computing devices 14 may include other processing circuitry such as one or more processors 28 configured to execute instructions 30 stored in memory media 32 of the respective computing device 14, wherein the instructions 30, when executed by the one or more processors 28, enable the respective computing device 14 to track activity (e.g., interaction with the member benefit application 16, as well as other web pages, applications, and so forth) of a member 12 using the respective computing device 14, as described in greater detail herein.

In certain embodiments, the one or more processors 28 of the computing devices 14 may be any suitable type of computer processors or microprocessors capable of executing computer-executable code. In certain embodiments, the memory media 32 of the computing devices 14 may be any suitable articles of manufacture that can serve as media to store processor-executable code, data, or the like. These articles of manufacture may represent computer-readable media (e.g., any suitable form of memory or storage) that may store processor-executable code (e.g., the instructions 30) executed by the one or more processors 28 to perform the presently disclosed techniques. In certain embodiments, the memory media 32 of the computing devices 14 may represent tangible, non-transitory computer-readable media (e.g., any suitable form of memory or storage) that may store the processor-executable code used by the one or more processors 28 to perform various techniques described herein. It should be noted that non-transitory merely indicates that the media is tangible and not a signal. It should be noted that the components described above with regard to the computing devices 14 are exemplary components, and the computing devices 14 may include additional or fewer components in certain embodiments.

In addition, in certain embodiments, the computing devices 14 may include communication circuitry 34 configured to facilitate communication between the respective computing device 14 and the push notification monitoring/generation system 22 (as well as with the owned or rented property 18 and/or the external sources 20 to the extent that relevant activity with these on the part of the members 12 may be facilitated). For example, in certain embodiments, the computing devices 14 may send data relating to the detected activity to the push notification monitoring/generation system 22 to facilitate the push notification generation described herein. In certain embodiments, the communication circuitry 34 may facilitate communications using Wi-Fi, near field communication, Bluetooth, Zigbee, radio frequency identification (RFID) tags and/or readers, an embedded wireless module, and/or another suitable wired or wireless communication network 36.

In addition, in certain embodiments, the owned or rented property 18 may be configured to detect certain activity of one or more members 12 external to the one or more computing devices 14. In particular, as described in greater detail herein, the owned or rented property 18 may each include one or more sensors 38 (e.g., cameras, location sensors, motion sensors, temperature sensors, sound sensors, security appliances, smart appliances, and so forth) configured to detect certain activity of one or more members 12, which may be used by the push notification monitoring/generation system 22 (e.g., either in addition to or alternatively to the activity detected by the one or more computing devices 14) to facilitate the push notification generation described herein. For example, in certain embodiments, the owned or rented property 18 may include one or more cameras configured to capture images and/or video of the member 12, as described in greater detail herein. In addition, in certain embodiments, the owned or rented property 18 may include global positioning systems (GPSs) and other location sensors configured to detect locations of the member 12, as described in greater detail herein. In addition, in certain embodiments, the owned or rented property 18 may include motion sensors, temperature sensors, sound sensors, security appliances (e.g., smart doorbells, security cameras, smart locks, and so forth), and smart appliances (e.g., smart refrigerators, smart televisions, smart video game consoles, and so forth) configured to detect certain activity of the member 12, as described in greater detail herein.

In addition, in certain embodiments, the owned or rented property 18 may include communication circuitry 40 configured to facilitate communication between the owned or rented property 18 and the push notification monitoring/generation system 22 via a communication network 36. For example, as described in greater detail herein, in certain embodiments, the owned or rented property 18 may send data relating to the detected activity of the member 12 to the push notification monitoring/generation system 22 to facilitate the push notification generation described herein. In certain embodiments, the communication circuitry 40 may facilitate communications using Wi-Fi, near field communication, Bluetooth, Zigbee, radio frequency identification (RFID) tags and/or readers, an embedded wireless module, and/or another suitable wired or wireless communication network 36.

In addition, in certain embodiments, as described in greater detail herein, the external sources 20 may include, but are not limited to, merchants, financial institutions, rideshare applications, rental car companies, travel agencies, airlines, hospitality organizations, and so forth, which may be interacted with by the members 12, for example, either via applications (e.g., the member benefit application 16 or other applications) being executed on computing devices 14 associated with the members 12 or in person. As will be appreciated, commercial activity with these external sources 20 may also be communicated to the push notification monitoring/generation system 22 via the communication network 36.

In response to receiving data relating to detected activity of a member 12 from one or more computing devices 14, owned or rented property 18, and/or external sources 20, the push notification monitoring/generation system 22 may utilize push notification monitoring/analysis application 42 to analyze the data relating to the detected activity to identify pre-existing member benefits provided by the organization to the member 12 relating to the detected activity and/or to identify certain member benefits provided by the organization that might be of interest to the member 12 relating to the detected activity, and may automatically generate push notifications relating to these member benefits that are transmitted to the member benefit application 16 via the computing device 14 associated with the member 12 for the purpose of alerting the member 12 of such member benefits, as described in greater detail herein.

In addition, in certain embodiments, the push notification monitoring/generation system 22 may be configured to correlate certain types of detected member activity with other types of detected member activity to ensure that the detected member activity is, indeed, accurate. For example, in certain embodiments, if the push notification monitoring/generation system 22 receives data the suggests that a particular member is travelling using one type of detected member activity, as described in greater detail herein, the push notification monitoring/generation system 22 may check another type of member activity (e.g., credit card usage in another state, in another country, and so forth) to verify that the particular member 12 is, indeed, most likely travelling.

In certain embodiments, the push notification monitoring/generation system 22 may include communication circuitry 44 configured to facilitate communication between the push notification monitoring/generation system 22 and the computing devices 14, the owned or rented property 18, and/or the external sources 20, as described in greater detail herein. For example, as described in greater detail herein, in certain embodiments, the push notification monitoring/generation system 22 may receive data relating to activity of members 12 from one or more computing devices 14, one or more owned or rented property 18, and/or one or more external sources 20 via the communication network 36, and may automatically send notifications to members 12 via computing devices 14 to notify the members 12 of the analysis performed by the push notification monitoring/generation system 22, as described herein. In certain embodiments, the communication circuitry 44 may facilitate communications using Wi-Fi, near field communication, Bluetooth, Zigbee, radio frequency identification (RFID) tags and/or readers, an embedded wireless module, and/or another suitable wired or wireless communication network 36.

As illustrated in FIG. 1, in certain embodiments, the push notification monitoring/generation system 22 may include other processing circuitry such as one or more processors 46 configured to execute instructions 48 stored in memory media 50 of the push notification monitoring/generation system 22, wherein the instructions 48, when executed by the one or more processors 46, enable the push notification monitoring/analysis application 42 to perform the functions described in greater detail herein. In certain embodiments, the one or more processors 46 of the push notification monitoring/generation system 22 may be any suitable type of computer processors or microprocessors capable of executing computer-executable code. In certain embodiments, the memory media 50 of the push notification monitoring/generation system 22 may be any suitable articles of manufacture that can serve as media to store processor-executable code, data, or the like. These articles of manufacture may represent computer-readable media (e.g., any suitable form of memory or storage) that may store processor-executable code (e.g., the instructions 48) executed by the one or more processors 46 to perform the presently disclosed techniques.

In certain embodiments, the memory media 50 of the push notification monitoring/generation system 22 may also be used to store data relating to detected activity of members 12, as described in greater detail herein. In certain embodiments, the memory media 50 of the push notification monitoring/generation system 22 may represent tangible, non-transitory computer-readable media (e.g., any suitable form of memory or storage) that may store the processor-executable code used by the one or more processors 46 to perform various techniques described herein. It should be noted that non-transitory merely indicates that the media is tangible and not a signal. It should be noted that the components described above with regard to the push notification monitoring/generation system 22 are exemplary components, and the push notification monitoring/generation system 22 may include additional or fewer components in certain embodiments.

As such, a member benefit application 16 being executed on a computing device 14 associated with a particular member 12, owned or rented property 18 being operated by the particular member 12, and/or external sources 20 with which the particular member 12 interacts may monitor activity of the particular member 12, and the data relating to this monitored activity may be used by the push notification monitoring/generation system 22 to generate automatic notifications for the particular member 12 relating to the monitored activity. For example, in certain embodiments, the data relating to the monitored activity of the member 12 may include products (e.g., large purchases such as cars, boats, furniture, home remodeling, electronics, appliances, etc.) being purchased, or just shopped for, by the member 12. Indeed, in certain embodiments, the data relating to the monitored activity of the member 12 may include detection that the member 12 is simply located within a particular store (e.g., that sells certain types of products). In addition, in certain embodiments, the data relating to the monitored activity of the member 12 may include detection that the member 12 is (or will be) at locations where insurance may be provided (e.g., rental car locations, foreign countries, etc.).

Furthermore, in certain embodiments, the data relating to the monitored activity of the member 12 may include detection that the member 12 is (or will be) traveling. For example, in certain embodiments, the data relating to the monitored activity of the member 12 may include geofencing and/or itinerary data, for example, detection of a car operated by the member being parked at an airport, detection that the member 12 took a rideshare to an airport, detection of payment by the member 12 to a rental facility, and so forth. In addition, in certain embodiments, the data relating to the monitored activity of the member 12 may include detection of purchase of (or even browsing for) airline tickets and/or hotel/resort accommodations by the member 12. In addition, in certain embodiments, the data relating to the monitored activity of the member 12 may include a location change of the member 12 in relatively short period of time to detect, for example, air travel. In addition, in certain embodiments, the data relating to the monitored activity of the member 12 may include logins by the member 12 from foreign countries, cell phone towers (e.g., local communication networks) indicating that the member 12 may be in different countries, and so forth.

For example, in certain embodiments, CSLI collected by wireless carriers may comprise location information of the member. Cell phones, when in use, may continuously scan the environment to detect the strongest signal, usually coming from the closest cell phone towers. Each time a cell phone connects to a cell phone tower, it generates a time-stamped record known as CSLI comprising geographic area location information of the cell phone, and the wireless carriers may use this CSLI to plan their network or apply charges (e.g., roaming charges, international rates, and so forth). By way of example, the CSLI may indicate that the member is travelling a relatively large distance in a relatively short period of time (e.g., travelling to a foreign country) by comparing the CSLI of the member at different times during a time period. As data usage from cell phones has increased, more cell sites have been installed to cover a certain area leading to more precise location information. Thus, in certain embodiments, CSLI may provide relatively precise location information of the member, and this relatively precise location information (e.g., airports, rental facilities, merchants, hospitality organizations, relatively high risk areas for criminal or health concerns based on statistic-based prediction/geofencing, and so forth) may also be used to monitor activity of the member in a local area and help determine related benefits/insurance decisions, as described in greater detail herein.

In addition, in certain embodiments, the data relating to the monitored activity of the member 12 may include detection that the member 12 has been involved in an accident. For example, motion sensors, sound sensors, or cameras inside the property 18 may detect certain activities (e.g., moving extremely slowly or in a way indicating disabilities) of the member 12 indicating that the member 12 may have been involved in an accident. In addition, in certain embodiments, smart security appliances may detect certain activities of the member 12 indicating that the member 12 may have been involved in an accident. In addition, in certain embodiments, wearable computing devices may provide physiological information (e.g., heart rate, and so forth) related to the health of the member 12 indicating that the member 12 has been involved in an accident. In addition, in certain embodiments, location sensors may provide location information (e.g., an emergency room in hospitality organizations) indicating that the member 12 has been involved in an accident. In addition, in certain embodiments, temperature sensors inside the property 18 may detect extreme temperatures indicating a fire or a condition not suitable for the member 12 (e.g., vehicle or home on fire). Furthermore, in certain embodiments, the data relating to the monitored activity of the member 12 may include detection of when member 12 is driving in areas that have underinsured drivers (e.g., based on statistic-based prediction/geofencing). For example, wearable computing devices, smart phones, or the vehicles themselves may provide location information of the member 12 while the member 12 is driving a particular vehicle.

In response to the monitored activity, the automatic notifications generated for the member 12 by the push notification monitoring/generation system 22 may include notifications relating to loans for a purchased product. In addition, in certain embodiments, the automatic notifications generated for the member 12 by the push notification monitoring/generation system 22 may include notifications relating to an extended warranty for a purchased product (or that an extended warranty is already available to the member 12). In addition, in certain embodiments, the automatic notifications generated for the member 12 by the push notification monitoring/generation system 22 may include notifications when a purchased product is already covered under a pre-existing insurance plan (e.g., home insurance), for example. In addition, in certain embodiments, the automatic notifications generated for the member 12 by the push notification monitoring/generation system 22 may include notifications recommending changing a payment method (e.g., during payment) to a credit card provided by the organization. For example, in certain embodiments, the automatic notifications generated for the member 12 by the push notification monitoring/generation system 22 may include notifications to use particular payment vehicles (e.g., a credit card provided by the organization) to maximize discounts, member benefits, insurance, and so forth.

In addition, in certain embodiments, the automatic notifications generated for the member 12 by the push notification monitoring/generation system 22 may include notifications warning the member 12 to not pay for unneeded products (such as rental car insurance, travel insurance, medigap health insurance for foreign travel, and so forth, that is already provided by the organization). In addition, in certain embodiments, the automatic notifications generated for the member 12 by the push notification monitoring/generation system 22 may include notifications offering travel insurance when the member 12 is determined to be (or will be) traveling. In addition, in certain embodiments, the automatic notifications generated for the member 12 by the push notification monitoring/generation system 22 may include notifications that the member 12 has insurance they might otherwise not be aware.

In addition, in certain embodiments, the automatic notifications generated for the member 12 by the push notification monitoring/generation system 22 may include notifications to offer insurance for potentially dangerous activities (skydiving, vaping, etc.) that the member 12 is detected to be doing (or that the member 12 may soon be doing) and/or to notify the member 12 that taking part in certain potentially dangerous activities may nullify an existing insurance policy. In such situations, in certain embodiments, the member benefit application 16 may ask the member 12 for additional information to potentially avoid nullifying the existing insurance policy. In addition, in certain embodiments, the automatic notifications generated for the member 12 by the push notification monitoring/generation system 22 may include notifications relating to spot life insurance for certain potentially dangerous events and activities relating over a period of time (e.g., 24 hours). In addition, in certain embodiments, the automatic notifications generated for the member 12 by the push notification monitoring/generation system 22 may include notifications relating to the provision of gap insurance for the member 12 by the organization.

In addition, in certain embodiments, the push notification monitoring/generation system 22 may perform other related actions in response to receiving the monitored activity described herein. For example, in certain embodiments, the push notification monitoring/generation system 22 may record certain purchases made by the member 12, for example, for loans, extended warranties, and so forth. In addition, in certain embodiments, the push notification monitoring/generation system 22 may enable the member benefit application 16 to provide insurance data between drivers of nearby cars, which may allow the member 12 to reroute or increase awareness to drive more carefully, avoid certain exits, and so forth.

Figure 2:
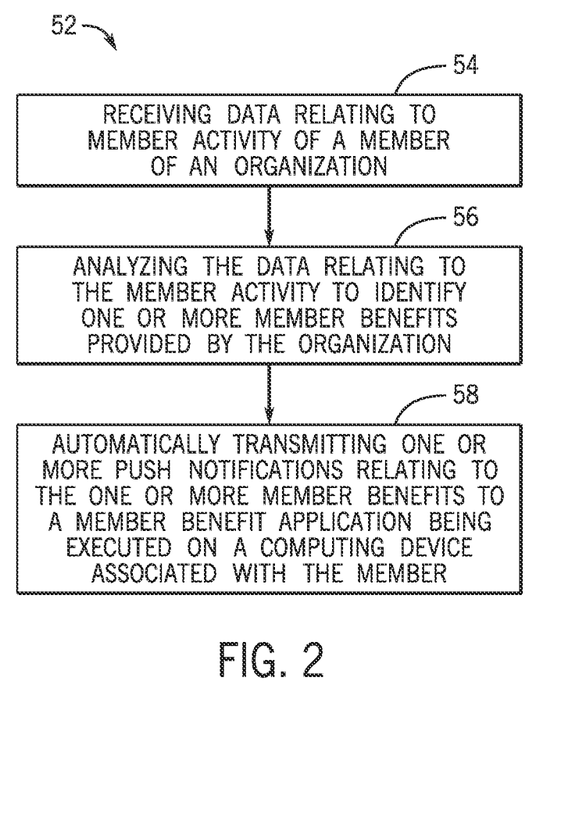
FIG. 2 is a flow diagram of a method for operating the push notification monitoring/generation system of FIG. 1, in accordance with embodiments described herein.

FIG. 2 is a flow diagram of a method 52 for operating the push notification monitoring/generation system 22 of FIG. 1. As illustrated in FIG. 2, at block 54, in certain embodiments, the method 52 includes receiving data relating to member activity of a member 12 of an organization, for example, monitored by a member benefit application 16 being executed on a computing device 14 associated with the particular member 12, by property 18 owned or otherwise being operated (e.g., when rented) by the particular member 12, or by one or more external sources 20, such as merchants, financial institutions, rideshare applications, rental car companies, travel agencies, airlines, hospitality organizations, and so forth. In certain embodiments, the data relating to the member activity relates to detection of the member 12 browsing for a product via an application being executed on the computing device 14 (e.g., through the member benefit application 16). In addition, in certain embodiments, the data relating to the member activity relates to detection of the member 12 purchasing a product (e.g., purchase transaction information from financial institutions). In addition, in certain embodiments, the data relating to the member activity relates to detection of the member 12 being located in a particular store (e.g., through GPS, CSLI, or other location sensors). In addition, in certain embodiments, the data relating to the member activity (e.g., received from sensors 38 or external sources 20) relates to detection of the member 12 being located in a certain area (e.g., airports, rental facilities, merchants, hospitality organizations high risk areas for criminal or health concern, areas having uninsured (or underinsured) drivers exceeding a threshold percentage of drivers in the areas, foreign countries, and so forth). In addition, in certain embodiments, the data relating to the member activity relates to detection that the member 12 has been involved in an accident. In addition, in certain embodiments, the data relating to the member activity relates to detection that the member 12 is currently travelling, and so forth.

Figure 4:
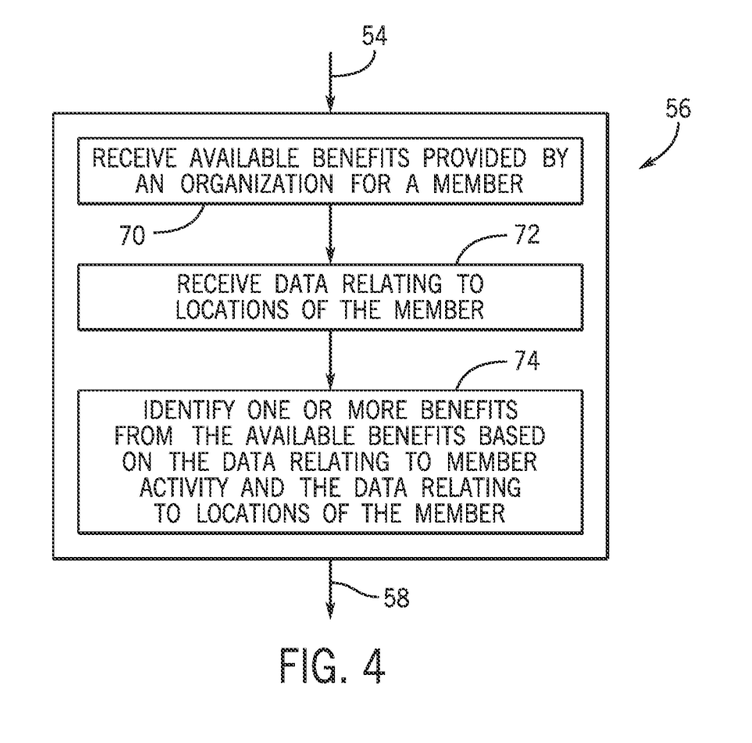
FIG. 4 is a flow diagram of a method for operating the method of FIG. 2, in accordance with embodiments described herein.

In addition, at block 56, in certain embodiments, the method 52 includes analyzing the data relating to the member activity to identify one or more member benefits provided by the organization, wherein the one or more member benefits are related to the member activity. In certain embodiments, the one or more member benefits include an offer for a loan relating to purchase of a product by the member 12. In such embodiments, the method 52 may optionally include storing a record of the loan relative to the purchase of the product. In addition, in certain embodiments, the one or more member benefits include an offer for a warranty relating to purchase of a product by the member 12. In such embodiments, the method 52 may optionally include storing a record of the warranty relative to the purchase of the product. By way of example, FIG. 4 is a flow diagram of example method steps that may be part of the block 56. That is, FIG. 4 illustrates a method to analyze the data relating to the member activity to identify one or more member benefits provided by the organization.

FIG. 4 is a flow diagram of a method 56 for operating the method of FIG. 2. As illustrated in FIG. 4, at block 70, the push notification monitoring/generation system 22 may receive available benefits provided by an organization for a member 12. Members of certain organizations (e.g., members 12 insured by an insurance company) are often entitled to certain member benefits (e.g., insurance coverage) of which the members 12 may not be aware. Those member benefits may be different for different members 12 (e.g., members 12 with different insurance coverages, insurance coverages related to age or health conditions, insurance coverages related to usage conditions, and so forth). As such, the push notification monitoring/generation system 22 may receive available benefits for a particular member 12.

At block 72 in FIG. 4, in certain embodiments, the push notification monitoring/generation system 22 may receive data relating to locations of the member 12 from sensors 38 (e.g., GPS or other location sensors), wearable computing devices, smart phones, vehicles, and so forth. In addition, in certain embodiments, the push notification monitoring/generation system 22 may receive data relating to locations of the member 12 from the external sources 20 (e.g., merchants, financial institutions, rideshare applications, rental car companies, travel agencies, airlines, hospitality organizations, and so forth), such as CSLI from wireless carriers, purchase transaction information from financial institutions, location data from rideshare applications or rental car companies, and so forth.

At block 74 in FIG. 4, the push notification monitoring/generation system 22 may identify one or more benefits from the available benefits for the member 12 based on the data relating to member activity and the data relating to locations of the member 12. The push notification monitoring/generation system 22 may utilize identification techniques (e.g., machine learning algorithms) to determine the relationship between the available benefits and the data relating to member activity and locations. In certain embodiments, the push notification monitoring/generation system 22 may identify certain benefits to use particular payment methods (e.g., a credit card provided by the organization) in a particular store to maximize discounts, member benefits, insurance, and so forth. In addition, in certain embodiments, the member 12 may have available benefits in foreign countries such as certain insurances (e.g., travel insurances, emergency health insurances, accidental and disability insurances, and so forth). The push notification monitoring/generation system 22 may identify the available benefits for the member 12 based on the data relating to member activity and locations.

Referring back to the FIG. 2, at block 58, in certain embodiments, the method 52 includes automatically transmitting one or more push notifications relating to the one or more member benefits to a member benefit application 16 being executed on a computing device 14 associated with the member 12. In certain embodiments, the one or more push notifications include a recommendation to change a payment method of a purchase of a product by the member 12 to a member payment method associated with the organization. In certain embodiments, the one or more push notifications include information of available benefits of certain insurances. In addition, in certain embodiments, the one or more push notifications include a command to automatically launch the member benefit application 16 on the computing device 14 (see, e.g., FIGS. 6 and 7).

Figure 3:
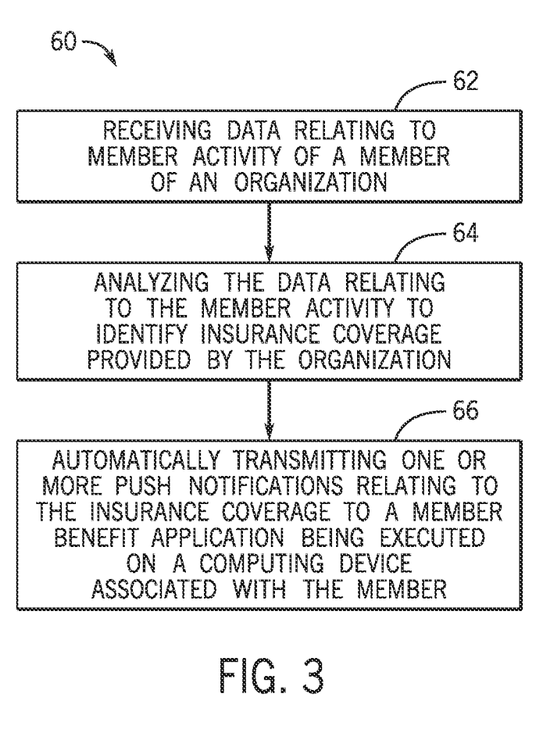
FIG. 3 is a flow diagram of another method for operating the push notification monitoring/generation system of FIG. 1, in accordance with embodiments described herein.

FIG. 3 is a flow diagram of another method 60 for operating the push notification monitoring/generation system 22 of FIG. 1. As illustrated in FIG. 3, at block 62, in certain embodiments, the method 60 includes receiving data relating to member activity of a member 12 of an organization monitored by a member benefit application 16 being executed on a computing device 14 associated with the particular member 12, by property 18 owned or otherwise being operated (e.g., when rented) by the particular member 12, or by one or more external sources 20, such as merchants, financial institutions, rideshare applications, rental car companies, travel agencies, airlines, hospitality organizations, and so forth. In certain embodiments, the data relating to the member activity relates to detection of the member 12 browsing for a product via an application being executed on the computing device 14 (e.g., through the member benefit application 16). In addition, in certain embodiments, the data relating to the member activity relates to detection of the member 12 purchasing a product (e.g., purchase transaction information from financial institutions). In addition, in certain embodiments, the data relating to the member activity relates to detection of the member 12 being located in a particular store (e.g., through GPS, CSLI, or other location sensors). In addition, in certain embodiments, the data relating to the member activity (e.g., received from sensors 38 or external sources 20) relates to detection of the member 12 being located in a certain area (e.g., airports, rental facilities, merchants, hospitality organizations high risk areas for criminal or health concern, areas having uninsured (or underinsured) drivers exceeding a threshold percentage, foreign countries, and so forth). In addition, in certain embodiments, the data relating to the member activity relates to detection that the member 12 has been involved in an accident.

In addition, in certain embodiments, the data relating to the member activity relates to detection that the member 12 is currently travelling. For example, in certain embodiments, the data relating to the member activity relates to detection that the member 12 has moved a relatively large distance in a relatively short period of time, detection that the member 12 has logged into the member benefit application 16 from a foreign country, detection that the computing device 14 is accessing a communication network in a foreign country, or some combination thereof. In addition, in certain embodiments, the data relating to the member activity relates to detection that the member 12 will be travelling. For example, in certain embodiments, the data relating to the member activity relates to detection that the member 12 is located at an airport, detection that the member 12 is parking a car near the airport, detection that the member 12 is taking a rideshare to the airport, detection that the member 12 is buying airline tickets or accommodations, or some combination thereof.

For example, in certain embodiments, CSLI collected by wireless carriers may comprise location information of the member. Cell phones, when in use, may continuously scan the environment to detect the strongest signal, usually coming from the closest cell phone towers. Each time a cell phone connects to a cell phone tower, it generates a time-stamped record known as CSLI comprising geographic area location information of the cell phone, and the wireless carriers may use this CSLI to plan their network or apply charges (e.g., roaming charges, international rates, and so forth). By way of example, the CSLI may indicate that the member is travelling a relatively large distance in a relatively short period of time (e.g., travelling to a foreign country) by comparing the CSLI of the member at different times during a time period. As data usage from cell phones has increased, more cell sites have been installed to cover a certain area leading to more precise location information. Thus, in certain embodiments, CSLI may provide relatively precise location information of the member, and this relatively precise location information (e.g., airports, rental facilities, merchants, hospitality organizations, relatively high risk areas for criminal or health concerns based on statistic-based prediction/geofencing, and so forth) may also be used to monitor activity of the member in a local area and help determine related benefits/insurance decisions, as described in greater detail herein.

In addition, in certain embodiments, the data relating to the member activity relates to detection that the member 12 has been involved in an accident. In addition, in certain embodiments, the data relating to the member activity relates to detection that the member 12 is driving in an area having uninsured (or underinsured) drivers exceeding a threshold percentage. In addition, in certain embodiments, the data relating to the member activity relates to detection that the member 12 is taking part in potentially dangerous activity.

Figure 5:
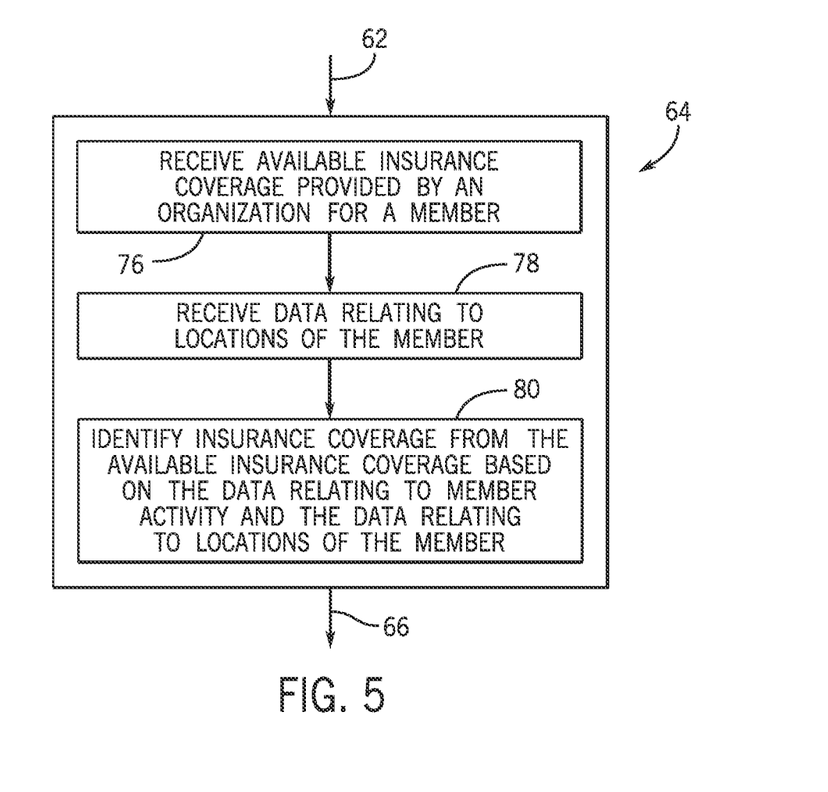
FIG. 5 is a flow diagram of a method for operating the method of FIG. 3, in accordance with embodiments described herein.

In addition, at block 64, in certain embodiments, the method 60 includes analyzing the data relating to the member activity to identify insurance coverage provided by the organization, wherein the insurance coverage is related to the member activity. By way of example, FIG. 5 is a flow diagram of example methods that may be part of the block 64. That is, FIG. 5 may provide a method to analyze the data relating to the member activity to identify insurance coverage provided by the organization.

FIG. 5 is a flow diagram of a method 64 for operating the method of FIG. 3. As illustrated in FIG. 5, at block 76, the push notification monitoring/generation system 22 may receive available insurance coverage provided by an organization for a member 12. Members of certain organizations (e.g., members 12 insured by an insurance company) are often entitled to certain insurance coverage of which the members 12 may not be aware. The insurance coverage may be different for different members 12 (e.g., members 12 with different insurance coverages, insurance coverages related to age or health conditions, insurance coverages related to usage conditions, and so forth). As such, the push notification monitoring/generation system 22 may receive available insurance coverage for a particular member 12.

At block 78 in FIG. 5, in certain embodiments, the push notification monitoring/generation system 22 may receive data relating to locations of the member 12 from sensors 38 (e.g., GPS or other location sensors), wearable computing devices, smart phones, or vehicles. In addition, in certain embodiments, the push notification monitoring/generation system 22 may receive data relating to locations of the member 12 from the external sources 20 (e.g., merchants, financial institutions, rideshare applications, rental car companies, travel agencies, airlines, hospitality organizations, and so forth), such as CSLI from wireless carriers, purchase transaction information from financial institutions, location data from rideshare applications or rental car companies, and so forth.

At block 80 in FIG. 5, the push notification monitoring/generation system 22 may identify insurance coverage from the available insurance coverage for the member 12 based on the data relating to member activity and the data relating to locations of the member. The push notification monitoring/generation system 22 may utilize identification techniques (e.g., machine learning algorithms) to determine the relationship between the available insurance coverage and the data relating to member activity and locations. For example, in certain embodiments, the push notification monitoring/generation system 22 may identify certain insurance coverage in foreign countries (e.g., travel insurances, emergency health insurances, accidental and disability insurances, and so forth) for the member 12 based on the data relating to member activity and locations.

Referring back to the FIG. 3, at block 66, in certain embodiments, the method 60 includes automatically transmitting one or more push notifications relating to the insurance coverage to a member benefit application 16 being executed on a computing device 14 associated with the member 12. In certain embodiments, the one or more push notifications include information of certain available insurance coverage in a foreign country.

Figure 6:
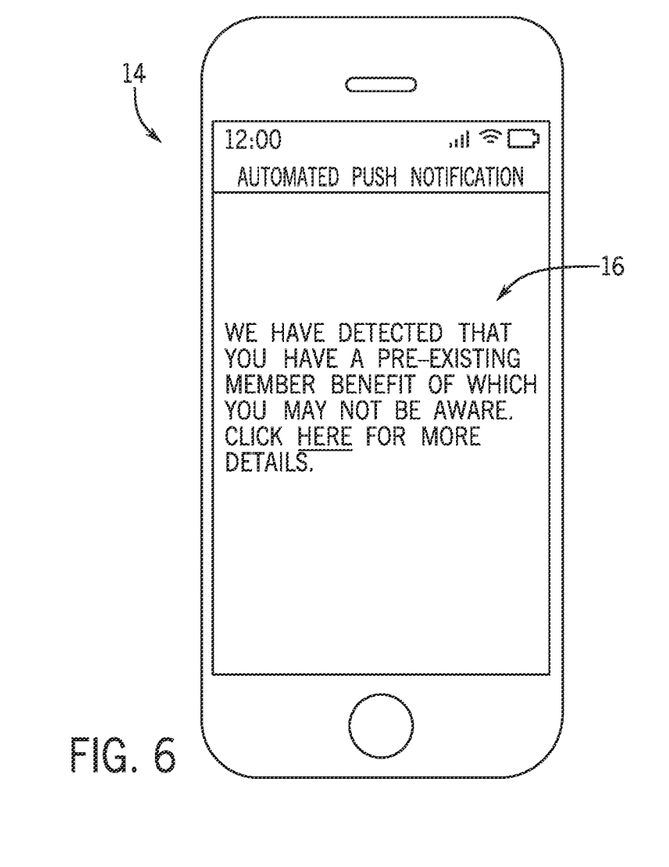
FIG. 6 illustrates a member benefit application being automatically launched on a computing device to notify a member associated with the computing device that the member has a pre-existing member benefit, in accordance with embodiments described herein.
Figure 7:
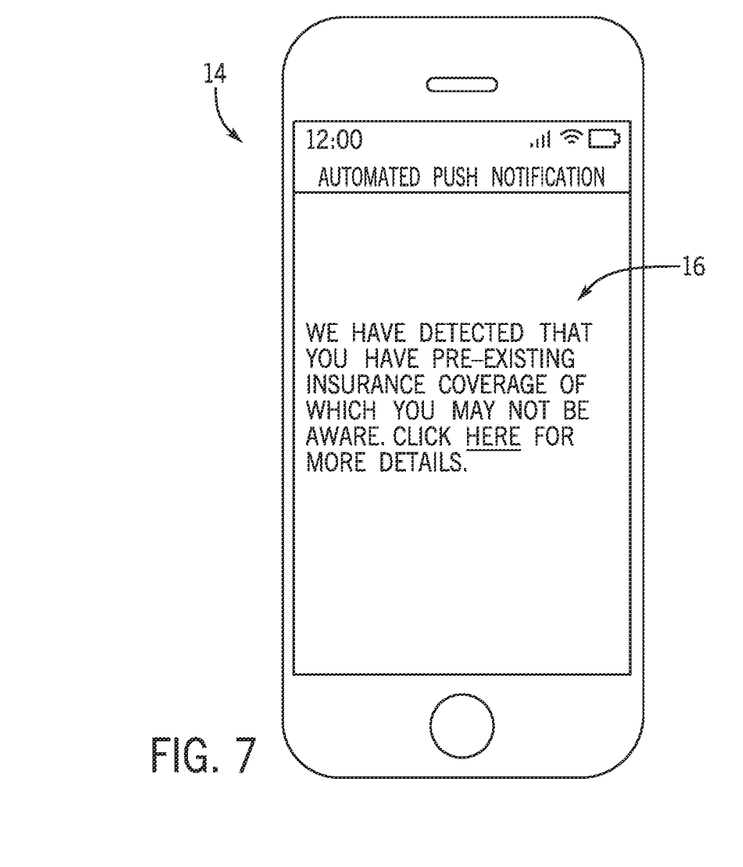
FIG. 7 illustrates a member benefit application being automatically launched on a computing device to notify a member associated with the computing device that the member has pre-existing insurance coverage, in accordance with embodiments described herein.

In certain embodiments, the one or more push notifications include a notification of pre-existing member benefits and/or pre-existing insurance coverage provided to the member 12 by the organization, wherein the pre-existing member benefits and/or pre-existing insurance coverage relates to the member activity, as described in greater detail herein. In addition, in certain embodiments, the one or more push notifications may include an offer for additional member benefits and/or additional insurance coverage provided by the organization, wherein the additional member benefits and/or additional insurance coverage relates to the member activity, as described in greater detail herein. In addition, in certain embodiments, the one or more push notifications include a command to automatically launch the member benefit application 16 on the computing device 14 (see, e.g., FIGS. 6 and 7). For example, as illustrated in FIG. 6, in certain embodiments, the member benefit application 16 may be automatically launched on a computing device 14 to notify a member 12 associated with the computing device 14 that the member 12 has a pre-existing member benefit of which the member 12 was not aware. In addition, as illustrated in FIG. 7, in certain embodiments, the member benefit application 16 may be automatically launched on a computing device 14 to notify a member 12 associated with the computing device 14 that the member 12 has a pre-existing insurance coverage of which the member 12 was not aware. As such, the embodiments described herein improve the functionality of the computing devices 14 by enabling them to notify members 12 of pre-existing member benefits and/or pre-existing insurance coverage based, for example, on detected activity of the members 12 in a manner that computing devices were not heretofore capable.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112 (f). However, for any claims containing elements designated in any other manner, it is intended that such elements are not to be interpreted under 35 U.S.C. § 112 (f).

The invention claimed is:

1. A push notification monitoring/generation system, comprising:
one or more processors configured to execute computer-executable instructions, wherein the computer-executable instructions, when executed by the one or more processors, cause the one or more processors to:
receive data relating to member activity of a member of an organization, wherein the data relating to the member activity comprises current location data of the member detected by one or more sensors, and wherein the current location data indicates that the member is currently located at a particular type of location;
in response to receiving an indication that the member is currently located at the particular type of location, analyze the data relating to the member activity to identify one or more member benefits provided by the organization, wherein the one or more member benefits comprise one or more insurance-related benefits that are determined based at least in part on the member activity being located at the particular type of location, wherein the one or more insurance-related benefits comprise a suggested gap insurance that is determined by detecting that the member is in a relatively high risk location based at least in part on the current location data;
determine a suggested change for the one or more insurance-related benefits based on the suggested gap insurance;
automatically transmit one or more push notifications comprising a reminder of the one or more member benefits and the suggested change for the one or more insurance-related benefits to a member benefit application being executed on a computing device associated with the member; and
automatically launch the member benefit application on the computing device showing the one or more push notifications.

2. The push notification monitoring/generation system of claim 1, wherein the data relating to the member activity relates to detection of the member browsing for a product via another application being executed on the computing device.

3. The push notification monitoring/generation system of claim 1, wherein the data relating to the member activity relates to detection of the member purchasing a product.

4. The push notification monitoring/generation system of claim 1, wherein the data relating to the member activity relates to detection of the member being located in a particular store.

5. The push notification monitoring/generation system of claim 1, wherein the one or more member benefits comprise an offer for a loan relating to purchase of a product by the member.

6. The push notification monitoring/generation system of claim 5, wherein the computer-executable instructions, when executed by the one or more processors, cause the one or more processors to store a record of the loan relative to the purchase of the product.

7. The push notification monitoring/generation system of claim 1, wherein the one or more member benefits comprise an offer for a warranty relating to purchase of a product by the member.

8. The push notification monitoring/generation system of claim 7, wherein the computer-executable instructions, when executed by the one or more processors, cause the one or more processors to store a record of the warranty relative to the purchase of the product.

9. The push notification monitoring/generation system of claim 1, wherein the one or more push notifications comprise a recommendation to change a payment method of a purchase of a product by the member to a member payment method associated with the organization.

10. The push notification monitoring/generation system of claim 1, wherein the one or more push notifications comprise a command to automatically launch the member benefit application on the computing device.

11. A method, comprising:
receiving, via a push notification monitoring/generation system, data relating to member activity of a member of an organization, wherein the data relating to the member activity comprises current location data of the member detected by one or more sensors, and wherein the current location data indicates that the member is currently located at a particular type of location;
in response to receiving an indication that the member is currently located at the particular type of location, analyzing, via the push notification monitoring/generation system, the data relating to the member activity to identify one or more member benefits provided by the organization, wherein the one or more member benefits comprise one or more insurance-related benefits that are determined based at least in part on the member activity being located at the particular type of location, wherein the one or more insurance-related benefits comprise a suggested gap insurance that is determined by detecting that the member is in a relatively high risk location based at least in part on the current location data;
determining a suggested change for the one or more insurance-related benefits based on the suggested gap insurance;
automatically transmitting, via the push notification monitoring/generation system, one or more push notifications comprising a reminder of the one or more member benefits and the suggested change for the one or more insurance-related benefits to a member benefit application being executed on a computing device associated with the member; and
automatically launching the member benefit application on the computing device showing the one or more push notifications.

12. The method of claim 11, wherein the data relating to the member activity relates to detection of the member browsing for a product via another application being executed on the computing device.

13. The method of claim 11, wherein the data relating to the member activity relates to detection of the member purchasing a product.

14. The method of claim 11, wherein the data relating to the member activity relates to detection of the member being located in a particular store.

15. The method of claim 11, wherein the one or more member benefits comprise an offer for a loan relating to purchase of a product by the member.

16. The method of claim 15, comprising storing, via the push notification monitoring/generation system, a record of the loan relative to the purchase of the product.

17. The method of claim 11, wherein the one or more member benefits comprise an offer for a warranty relating to purchase of a product by the member.

18. The method of claim 17, comprising storing, via the push notification monitoring/generation system, a record of the warranty relative to the purchase of the product.

19. The method of claim 11, wherein the one or more push notifications comprise a recommendation to change a payment method of a purchase of a product by the member to a member payment method associated with the organization.

20. The method of claim 11, wherein the one or more push notifications comprise a command to automatically launch the member benefit application on the computing device.

* * * * *